US012627465B2

(12) United States Patent
Eldefrawy et al.

(10) Patent No.: US 12,627,465 B2
(45) Date of Patent: May 12, 2026

(54) ATTRIBUTE BASED ENCRYPTION WITH BOUNDED COLLUSION RESISTANCE

(71) Applicant: SRI International, Menlo Park, CA (US)

(72) Inventors: Karim Eldefrawy, Palo Alto, CA (US); Nicholas James Genise, San Mateo, CA (US)

(73) Assignee: SRI International, Menlo Park, CA (US)

( * ) Notice: Subject to any disclaimer, the term of this patent is extended or adjusted under 35 U.S.C. 154(b) by 32 days.

(21) Appl. No.: 18/548,776

(22) PCT Filed: Mar. 2, 2022

(86) PCT No.: PCT/US2022/018531
§ 371 (c)(1),
(2) Date: Sep. 1, 2023

(87) PCT Pub. No.: WO2022/187369
PCT Pub. Date: Sep. 9, 2022

(65) Prior Publication Data
US 2024/0163078 A1 May 16, 2024

Related U.S. Application Data

(60) Provisional application No. 63/155,642, filed on Mar. 2, 2021.

(51) Int. Cl.
*H04L 9/06* (2006.01)
*H04L 9/30* (2006.01)

(52) U.S. Cl.
CPC .......... *H04L 9/0618* (2013.01); *H04L 9/3066* (2013.01)

(58) Field of Classification Search
CPC ... H04L 9/0852; H04L 9/0858; H04L 9/0855; H04L 63/061; H04L 9/083; H04L 9/0822;
(Continued)

(56) References Cited

U.S. PATENT DOCUMENTS

| | | | | |
|---|---|---|---|---|
| 5,764,765 A * | 6/1998 | Phoenix | ................ | H04L 9/0858 |
| | | | | 380/256 |
| 6,748,083 B2 * | 6/2004 | Hughes | ................. | H04L 9/0858 |
| | | | | 380/278 |

(Continued)

FOREIGN PATENT DOCUMENTS

| | | |
|---|---|---|
| CN | 104144057 A | 11/2014 |

OTHER PUBLICATIONS

Bellare et al., "Random Oracles are Practical: A Paradigm for Designing Efficient Protocols", First ACM Conference on Computer and Communications Security, Nov. 1993, 21 pp.
(Continued)

*Primary Examiner* — Sharif E Ullah
(74) *Attorney, Agent, or Firm* — Shumaker & Sieffert, P.A.

(57) ABSTRACT

An attribute based encryption system includes a key generator configured to generate a cyclic group (G) having a prime order q; generate an attribute key matrix (M); generate a master public key (MPK) based, at least in part, on the group (G) and (M); generate a master secret key (MSK) based on a first vector s and a second vector t that represent an encryption policy; generate a user secret key based, at least in part, on the MSK and on a set of one or more user attributes; and send the user secret key to a user device, wherein a ciphertext message can be successfully decrypted if a vector y associated with attributes of the user associated with the user secret key is orthogonal to each row of a set of
(Continued)

rows of M selected according to a set of authorization attributes used to encrypt the ciphertext message.

25 Claims, 7 Drawing Sheets

(58) Field of Classification Search
    CPC ....... H04L 9/3226; H04L 9/0891; H04L 9/14;
            H04L 9/0827; H04L 2209/24; H04L 9/08;
            H04L 9/0819; H04L 9/088; H04L 9/0869;
                H04L 9/0618; H04W 12/041; H04W
                12/0431; H04W 12/0433; H04W 12/04;
            H04W 12/61; H04W 12/63; H04W 12/71;
                G06F 21/31; G06F 21/44; G06F 7/588;
                    G06F 21/72; G06F 21/86
    USPC .......... 380/28, 255, 264, 276; 713/150, 163,
                        713/181; 726/2, 21, 36
    See application file for complete search history.

(56) References Cited

U.S. PATENT DOCUMENTS

| | | | | |
|---|---|---|---|---|
| 7,437,081 | B2* | 10/2008 | Mitchell | H04B 10/70 |
| | | | | 398/154 |
| 8,050,566 | B2* | 11/2011 | Luo | H04L 9/0852 |
| | | | | 380/278 |
| 8,654,979 | B2* | 2/2014 | Hicks | H04L 9/0852 |
| | | | | 380/278 |
| 8,755,525 | B2* | 6/2014 | Wiseman | H04L 9/0852 |
| | | | | 380/278 |
| 8,762,728 | B2* | 6/2014 | Wiseman | H04L 9/321 |
| | | | | 380/279 |
| 8,855,316 | B2* | 10/2014 | Wiseman | H04L 9/0855 |
| | | | | 380/278 |
| 9,960,465 | B2* | 5/2018 | Dudley | H01M 50/204 |
| 10,057,058 | B2* | 8/2018 | Murakami | H04L 9/0858 |
| 11,321,476 | B2* | 5/2022 | Lepoint | H04L 9/0618 |
| 11,621,836 | B2* | 4/2023 | Ashrafi | H04L 9/3239 |
| | | | | 713/171 |
| 2005/0138352 | A1* | 6/2005 | Gauvreau | H04L 9/3247 |
| | | | | 713/153 |
| 2005/0221759 | A1* | 10/2005 | Spadafora | G08G 1/093 |
| | | | | 455/39 |
| 2005/0262353 | A1* | 11/2005 | Gentry | H04L 9/3247 |
| | | | | 713/176 |
| 2007/0065154 | A1* | 3/2007 | Luo | H04J 14/0282 |
| | | | | 398/141 |
| 2007/0076884 | A1* | 4/2007 | Wellbrock | H04L 9/0855 |
| | | | | 380/263 |
| 2007/0195774 | A1* | 8/2007 | Sherman | H04L 69/16 |
| | | | | 370/392 |
| 2011/0019822 | A1* | 1/2011 | Khan | H04L 9/0833 |
| | | | | 380/255 |
| 2011/0206204 | A1* | 8/2011 | Sychev | H04J 14/06 |
| | | | | 380/256 |
| 2011/0213979 | A1* | 9/2011 | Wiseman | H04L 9/0844 |
| | | | | 713/171 |
| 2014/0010234 | A1* | 1/2014 | Patel | H04L 45/74 |
| | | | | 370/392 |
| 2014/0068765 | A1* | 3/2014 | Choi | H04L 63/1416 |
| | | | | 726/23 |
| 2014/0133652 | A1* | 5/2014 | Oshida | H04L 9/0897 |
| | | | | 380/255 |
| 2016/0127127 | A1* | 5/2016 | Zhao | H04W 12/041 |
| | | | | 713/171 |
| 2016/0155327 | A1* | 6/2016 | Schlienz | G08G 1/096791 |
| | | | | 340/907 |
| 2016/0241396 | A1* | 8/2016 | Fu | H04L 9/0836 |
| 2016/0344708 | A1* | 11/2016 | Kawai | H04L 9/0869 |
| 2016/0359626 | A1* | 12/2016 | Fu | H04L 9/0858 |
| 2016/0366094 | A1* | 12/2016 | Mason | H04L 61/5038 |
| 2017/0214525 | A1* | 7/2017 | Zhao | H04W 12/0431 |
| 2017/0230173 | A1* | 8/2017 | Choi | H04L 9/0861 |
| 2017/0338952 | A1* | 11/2017 | Hong | H04L 9/083 |
| 2018/0006811 | A1* | 1/2018 | Zhu | H04L 9/14 |
| 2018/0176091 | A1* | 6/2018 | Yoon | H04L 5/1446 |
| 2019/0036821 | A1* | 1/2019 | Levy | G06F 12/0868 |
| 2019/0260581 | A1* | 8/2019 | Su | H04L 9/08 |
| 2019/0349392 | A1* | 11/2019 | Wetterwald | H04L 43/0852 |
| 2020/0084222 | A1* | 3/2020 | William | H04L 63/12 |
| 2020/0322175 | A1* | 10/2020 | Chen | H04L 9/3066 |
| 2020/0412613 | A1* | 12/2020 | Masuda | H04L 12/185 |
| 2022/0006613 | A1* | 1/2022 | Hetzler | H04L 9/0825 |
| 2022/0360434 | A1* | 11/2022 | Choi | H04L 63/061 |
| 2022/0417750 | A1* | 12/2022 | Zhang | H04W 36/0038 |
| 2023/0145683 | A1* | 5/2023 | Mandich | H04L 9/0656 |
| | | | | 380/47 |

OTHER PUBLICATIONS

Elgamal,, "A Public Key Cryptosystem and a Signature Scheme Based on Discrete Logarithms", IEEE Transactions on Information Theory, vol. IT-31, No. 4, Jul. 1985, pp. 469-472.

Fadavi et al., "Injective Encodings to Binary Ordinary Elliptic Curves", SAC 2018: 25th International Conference, vol. 11349, Jan. 13, 2019, p. 434-449.

Fouque et al., "Injective Encodings to Elliptic Curves", Australasian Conference on Information Security and Privacy, vol. 7959, Jul. 2013, p. 203-218.

Herranz, "Attribute-Based Encryption Implies Identity-Based Encryption", IET Information Security, vol. 11, No. 6, Nov. 28, 2017, pp. 332-337.

International Preliminary Report on Patentability from International Application No. PCT/US2022/018531 dated Aug. 29, 2023, 8 pp.

International Search Report and Written Opinion of International Application No. PCT/US2022/018531 dated Aug. 15, 2022, 10 pp.

Invitation to Pay Additional Fees and, Where Applicable, Protest Fee from International Application No. PCT/US2022/018531, dated Jun. 13, 2022, 2 pp.

* cited by examiner

200

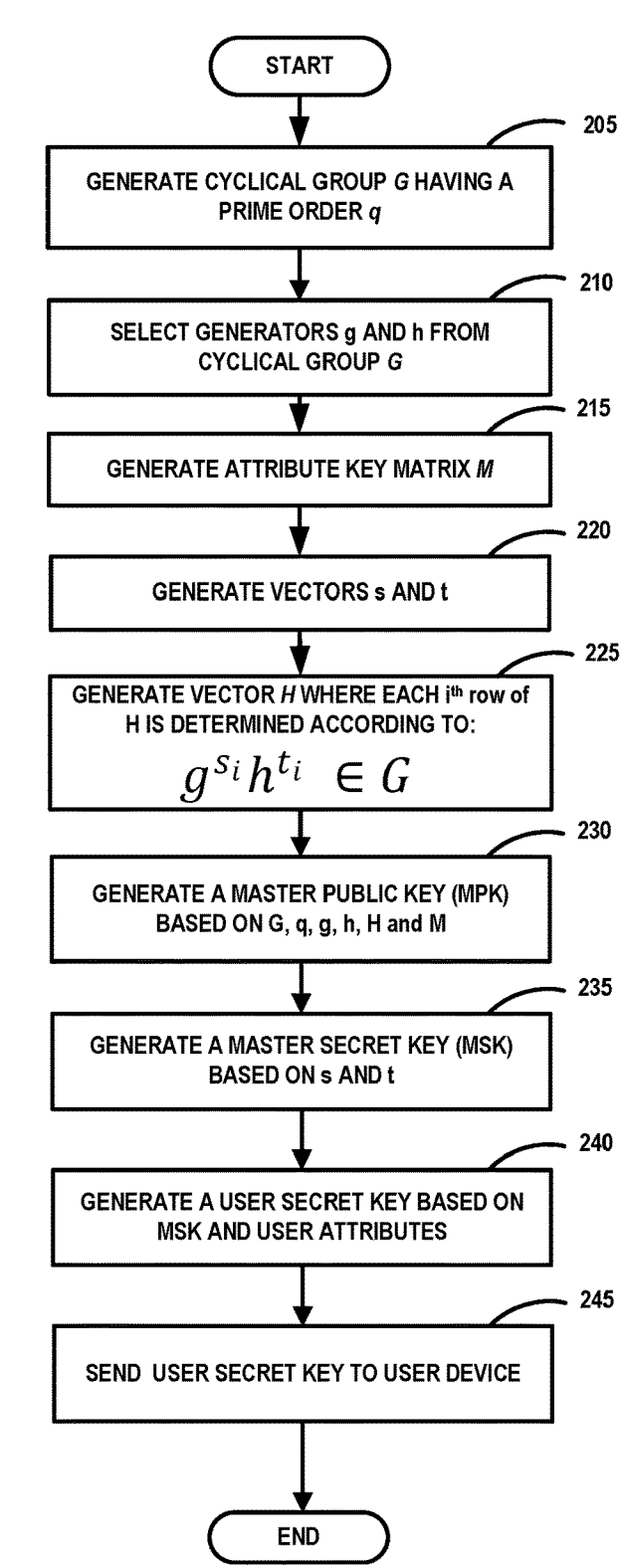

START

205

GENERATE CYCLICAL GROUP *G* HAVING A PRIME ORDER *q*

210

SELECT GENERATORS g AND h FROM CYCLICAL GROUP *G*

215

GENERATE ATTRIBUTE KEY MATRIX *M*

220

GENERATE VECTORS s AND t

225

GENERATE VECTOR *H* WHERE EACH $i^{th}$ row of H IS DETERMINED ACCORDING TO:

$$g^{s_i} h^{t_i} \in G$$

230

GENERATE A MASTER PUBLIC KEY (MPK) BASED ON G, q, g, h, H and M

235

GENERATE A MASTER SECRET KEY (MSK) BASED ON s AND t

240

GENERATE A USER SECRET KEY BASED ON MSK AND USER ATTRIBUTES

245

SEND USER SECRET KEY TO USER DEVICE

END

ENCRYPT

RECEIVE PLAINTEXT MESSAGE $u$, MASTER PUBLIC KEY (MPK), AND ENCRYPTION ATTRIBUTES f — 505

SELECT RANDOM COMIBINATION OF ROWS OF ATTRIIBUTE KEY MATRIX M THAT CORRESPOND WITH f — 510

SELECT RANDOM NON-ZERO EXPONENT r — 515

GENERATE CIPHERTEXT BASED ON PLAINTEXT MESSAGE, r, g, h, s — 520

OUTPUT CIPHERTEXT — 525

END

600

DECRYPT

RECEIVE CIPHERTEXT ct AND USER SECRET KEY $sk_x$ — 605

COMPUTE: — 610

$$\zeta = \left( \prod c_i^{y_i} \right) / \left( C^{sk_s} D^{sk_t} \right)$$

COMPUTE: — 615

$$z = \left( \sum y_i \right)^{-1} (mod\ q)$$

CREATE DECRYPTED MESSAGE u': — 620

$$\mu' = \zeta^z \in G$$

END

ATTRIBUTE BASED ENCRYPTION WITH BOUNDED COLLUSION RESISTANCE

CROSS REFERENCE

This application is a National Stage Entry of International Application No. PCT/US2022/018531, filed Mar. 2, 2022, which claims the priority benefit of U.S. Provisional Patent Application No. 63/155,642, filed on Mar. 2, 2021, each of which is hereby incorporated by reference.

GOVERNMENT RIGHTS

This invention was made with Government support under contract no. N66001-15-C-4071 awarded by Space and Naval Warfare (SPAWAR) Systems Center Pacific. The Government has certain rights in the invention.

TECHNICAL FIELD

This disclosure is related to encryption, and more specifically to attribute based encryption in computing systems.

BACKGROUND

Private data sharing remains a critical challenge for individuals, enterprises, and national/international organizations. While sharing data is essential, sharing sensitive data with the wrong partner can have devastating consequences or even be prohibited by law.

Attribute Based Encryption (ABE) is quickly becoming a desirable form of encryption for sharing sensitive data inside and between enterprises and other entities. This can be especially true when such data is stored by third parties in cloud platforms. ABE enables a fine-grained sharing of sensitive information. In some examples of ABE, organizations can set up attributes corresponding to natural sharing settings, e.g., corresponding to divisions, teams, and roles, and then issue keys to users depending on where in the organization they fit and/or their role.

SUMMARY

Standard public key encryption when used in organizational and inter-organizational settings is limiting and inadequate because it only enables selective sharing at a coarse-grained level. For example, anyone in possession of the private key corresponding to a specific public key under which a digital object is encrypted can decrypt the digital object. In addition, such organizational and inter-organizational settings are often dynamic because the set of users in such systems, and their identities, may be unknown, which renders issuing keys to specific identities impractical and cumbersome.

Attribute based encryption has been developed to provide a more fine-grained level of encryption in which the encryption of data is based on a combination of required attributes that a user must possess in order to decrypt data. However, in some existing system, attribute based encryption can be defeated when users collude with one another to combine their attributes in order to decrypt data. For example, assume that user A has a user key that allows decryption of data encrypted for attributes I, J and K. Further assume that user B has a user key that allows decryption of data encrypted for attributes K, L, M and N. In the case of data encrypted for attributes I, J, M and N, neither user A nor user B have the complete set of attributes needed to decrypt the data. However, user A and user B may collude and combine their attributes, thereby enabling user A and user B to decrypt the data by combining their attributes.

Some existing systems have implemented encryption schemes that attempt to make the encryption more resistant to collusion. However, such systems typically experience quadratic growth in the resources required to provide more collusion resistance.

In general, the disclosure describes techniques for performing attribute based encryption with bounded collusion resistance using an ElGamal style encryption scheme that further includes an "AND" gate. Details on the ElGamal encryption scheme may be found in ElGamal (1985). "*A Public-Key Cryptosystem and a Signature Scheme Based on Discrete Logarithms*". IEEE Transactions on Information Theory. 31 (4): 469-472, which is incorporated by reference herein in its entirety.

The AND gate can be implemented using a key matrix in which each row in the matrix corresponds to a decryption key for a particular attribute. A request to encrypt data may include a specification of the attributes that will be required to decrypt the data. The encryption scheme according to the techniques disclosed herein can thus encrypt data according to a modified disjunctive normal form (DNF) formula by encrypting the data under each "AND" clause represented by the selected row in the key matrix. The encryption scheme selects rows from the key matrix based on the specified attributes. In order to decrypt data encrypted using the scheme, the user must have all of the attributes used to encrypt the data.

The techniques described herein can be incorporated into a practical application such as an encryption/decryption system having one or more technical advantages over existing systems. For example, as discussed above, existing systems that attempt to provide collusion resistance typically experience quadratic grown in the resources used and the size of the ciphertext that corresponds to the degree to which collusion resistance is provided. In contrast, the techniques disclosed herein may provide an encryption system in which the growth in resources and the size of the generated ciphertext is linear, rather than quadratic. The collusion resistance of the techniques disclosed herein is generally related to the number of candidate attributes. Increasing the number of attributes provides a linear increase in collusion resistance along with a linear increase in the resources and size of ciphertext generated. For example, in some implementations, attribute lengths of 20, 50, 100 and 1000 produced corresponding ciphertext sizes of 5.632 kB, 13.32 kB, 26.11 kB, and 256.5 kB respectively, demonstrating a linear growth pattern to the encryption techniques disclosed herein.

In one example, this disclosure describes a method that includes generating, by one or more processors, a cyclic group G having a prime order q; selecting, by the one or more processors, a first generator g and a second generator h from the cyclic group G; generating, by the one or more processors, an attribute key matrix M, wherein each row of M corresponds to a candidate attribute of a plurality of candidate attributes; generating a first vector s and a second vector t, each of s and t having a length l corresponding to a number of candidate attributes; generating a vector H having the length l, wherein each $i^{th}$ component of H comprises a value determined by:

$$g^{s_i} h^{t_i}$$

3 generating, by the one or more processors, a master public key (MPK) based, at least in part, on the cyclic group G, q, g, h, H and M; generating a master secret key (MSK) based on the first vector s and the second vector t; generating, by the one or more processors, a user secret key, the user secret key based, at least in part, on the MSK and on a vector x representing one or more user attributes; and sending, by the one or more processors, the user secret key to a user device.

In another example, this disclosure describes an attribute based encryption system that includes one or more processors; and a key generator executable by the one or more processors and configured to: generate a cyclic group G having a prime order q, select a first generator g and a second generator h from the cyclic group G, generate an attribute key matrix M, wherein each row of M corresponds to a candidate attribute of a plurality of candidate attributes, generate a first vector s and a second vector t, each of s and t having a length l corresponding to a number of candidate attributes, generate a vector H having the length l, wherein each $i^{th}$ component of H comprises a value determined by:

$$g^{s_i} h^{t_i}$$

generate a master public key (MPK) based, at least in part, on the cyclic group G, q, g, h, H and M, generate a master secret key (MSK) based on the first vector s and the second vector t, generate a user secret key, the user secret key based, at least in part, on the MSK and on a vector x representing one or more user attributes, and send the user secret key to a user device.

In another example, this disclosure describes a method includes generating, by one or more processors, a cyclic group G having a prime order q; generating, by the one or more processors, an attribute key matrix M, wherein each row of M corresponds to a candidate attribute of a plurality of candidate attributes; generating, by the one or more processors, a master public key (MPK) based, at least in part, on the group G and M; generating a master secret key (MSK) based on a first vector s and a second vector t, where s and t representing an encryption policy; generating, by the one or more processors, a user secret key, the user secret key based, at least in part, on the MSK and on a set of one or more user attributes; and sending, by the one or more processors, the user secret key to a user device, wherein first plaintext associated with a ciphertext message and second plaintext associated with a decryption of the ciphertext message match if a vector y associated with attributes of the user associated with the user secret key is orthogonal to each row of a set of rows of M selected according to a set of authorization attributes used to encrypt the first plaintext.

The details of one or more examples of the techniques of this disclosure are set forth in the accompanying drawings and the description below. Other features, objects, and advantages of the technique will be apparent from the description and drawings, and from the claims.

BRIEF DESCRIPTION OF DRAWINGS

FIG. 2 is a flowchart illustrating example operations of a method for attribute based encryption, in accordance with techniques of the disclosure.

4

Figure 3:
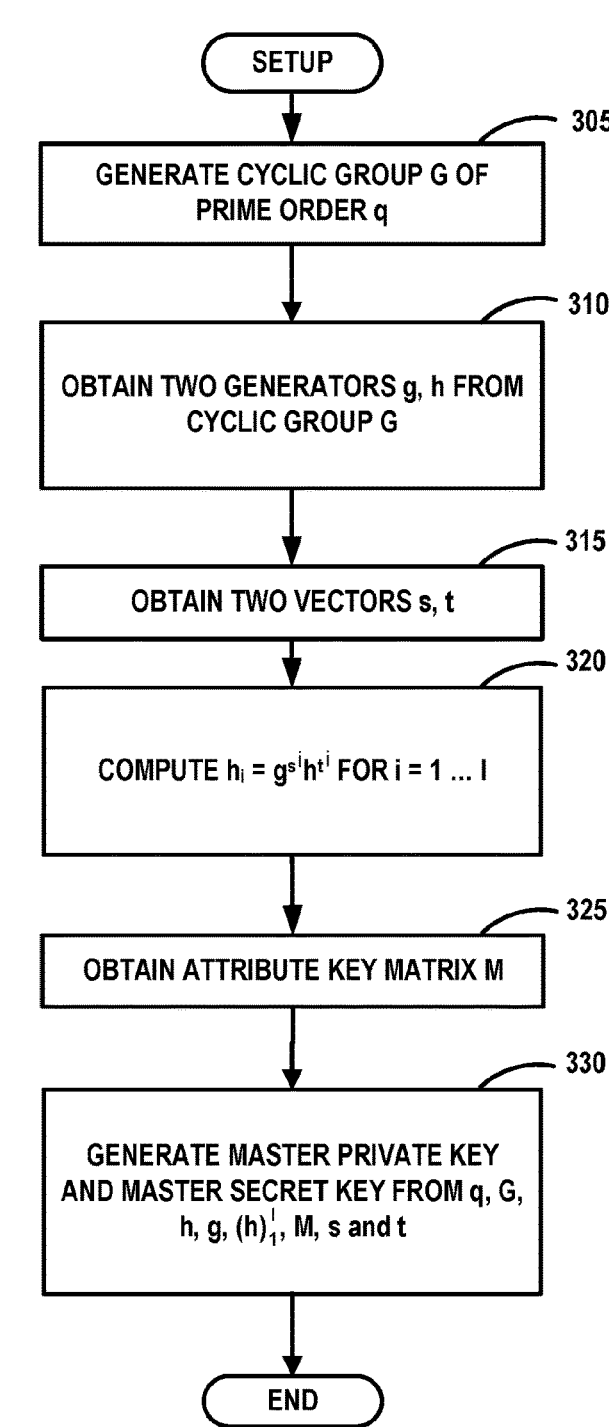

FIG. 3 is a flowchart illustrating example operations of a method for initializing an attribute based encryption system, in accordance with techniques of the disclosure.

Figure 4:
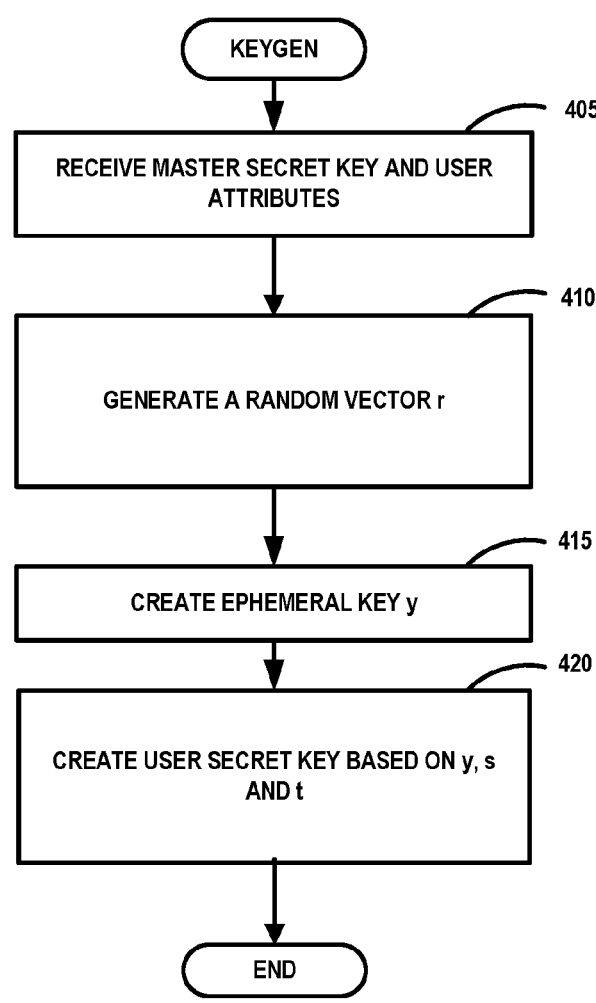

FIG. 4 is a flowchart illustrating example operations of a method for generating user secret keys, in accordance with techniques of the disclosure.

Figure 5:
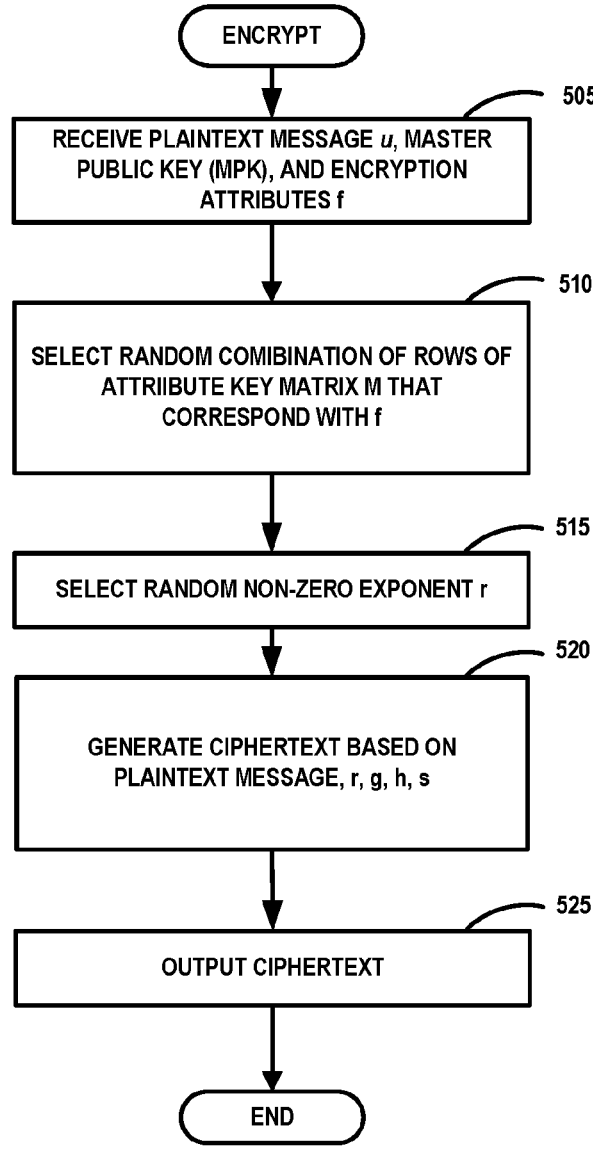

FIG. 5 is a flowchart illustrating example operations of a method for encrypting data in an attribute based encryption system, in accordance with techniques of the disclosure.

Figure 6:

FIG. 6 is a flowchart illustrating example operations of a method for decrypting data in an attribute based encryption system, in accordance with techniques of the disclosure.

Figure 7:
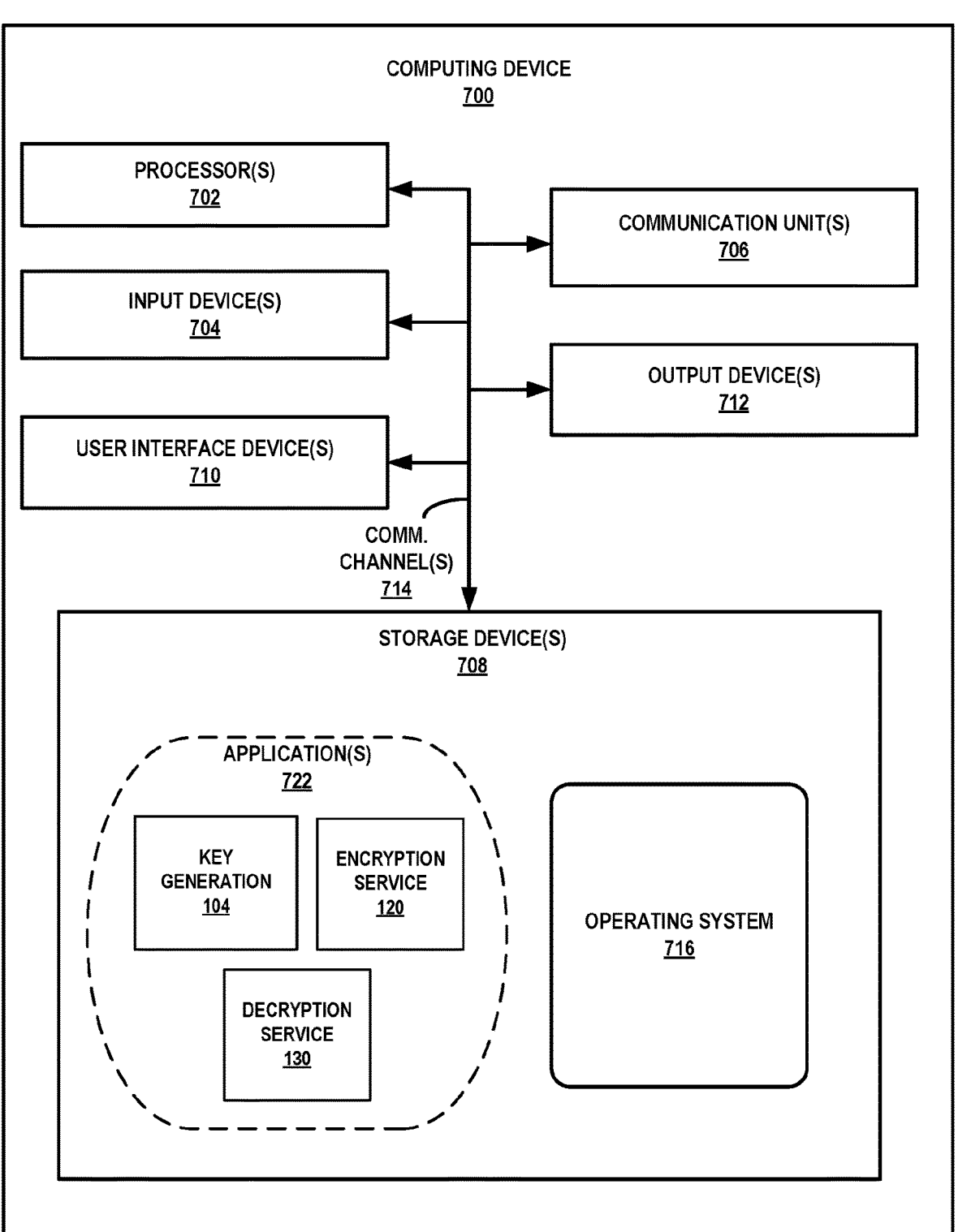

FIG. 7 is a block diagram illustrating further details of one example of a computing device that operates in accordance with one or more techniques of the present disclosure.

DETAILED DESCRIPTION

In the discussion of FIGS. 1-6 below, the following conventions may be used. The set of integers modulo q may be represented as $Z_q$. The group of multiplicative units in $Z_q$ may be represented as $$Z_q^*.$$

A canonical 1-dimensional vector space over $Z_q$ may be represented as $$Z_q^l.$$

A general cyclic group where the discrete log problem is "hard" may be represented as G. Attributes may be binary vectors of length l−1, which can be denoted as $x \in \{0, 1\}^{l-1}$. The notation ⟨ x, y⟩ refers to the inner product (e.g., dot product) of vector x and vector y.

Figure 1:
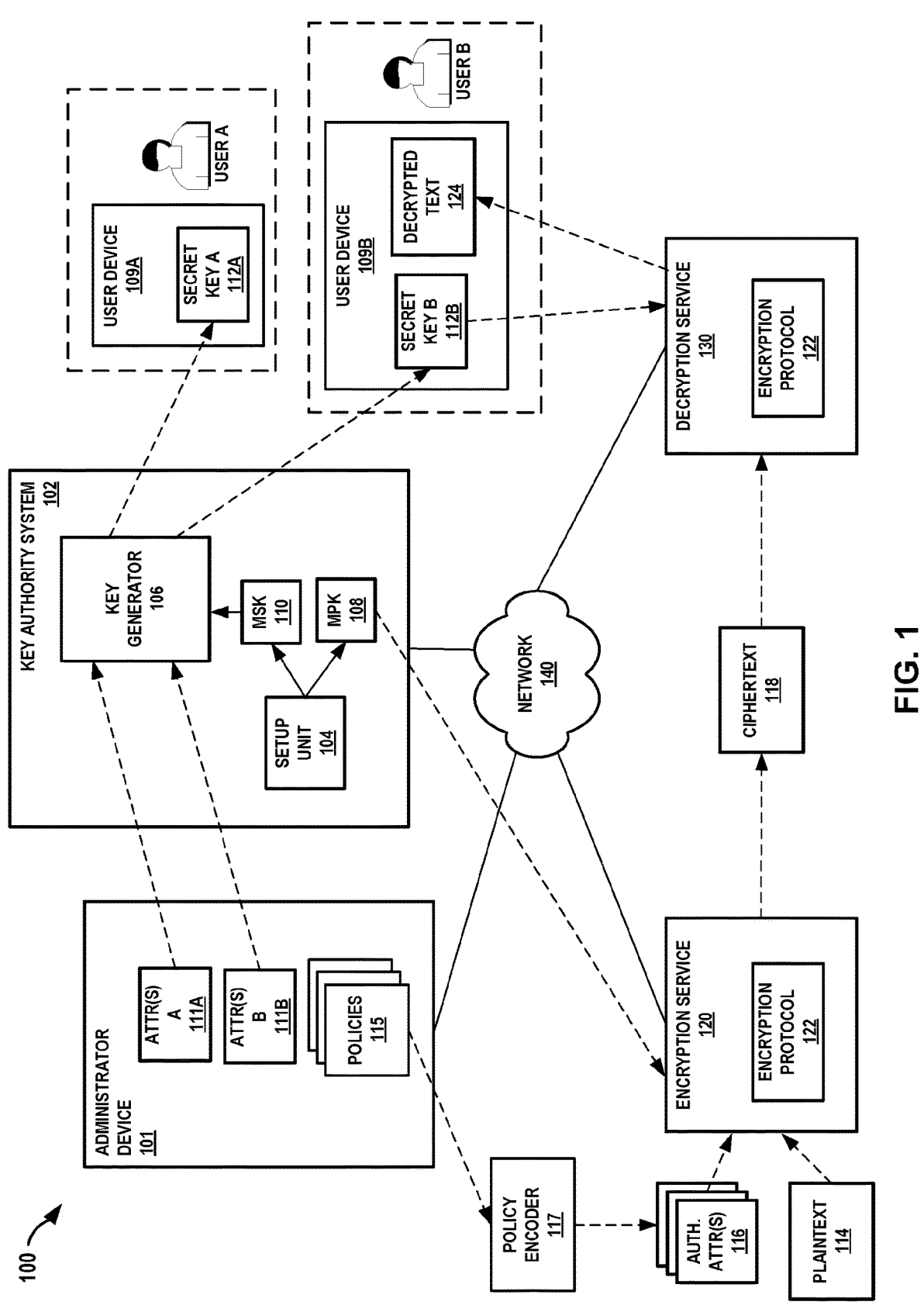
FIG. 1 illustrates an example attribute based encryption system with bounded collusion, in accordance with techniques of the disclosure.

FIG. 1 illustrates an example attribute based (ABE) encryption system with bounded collusion, in accordance with techniques of the disclosure. Generally speaking, ABE system 100 may be a key-based security system for an enterprise such as a company, government organization, association, etc. ABE system 100 may include key authority system 102, administrator device 101, user devices 109A and 109B, encryption service 120, and decryption service 130. ABE system 100 can be configured to encrypt and/or decrypt various types of data, including files, objects, or blocks of data. For example, in some aspects, encryption service 120 can encrypt data based, at least in part, on attributes specified as input to encryption service 120 by an encrypting party. In some aspects, decryption service 130 can decrypt encrypted data based, at least in part, on attributes possessed by the decrypting party. In some aspects, encrypting service 120 and decryption service 130 may be part of the same service and/or on the same computer system. In some aspects, the encryption service 120 and decryption service 130 are provided by different services and/or are not on the same server. In some embodiments, encryption service 120 and decryption service 130 may be part of the key authority system 102. Administrative device 101, user devices 109, key authority system 102, encryption service 120, and decryption service 130 may be communicatively coupled to one another via network 140. Network 140 may be a wired network, wireless network, or combination of the two. Network 140 may be a local area network, a corporate intranet, a wide area network, or the Internet. Key authority system 102 can include a setup unit 104 and a key generator 106. In some aspects, key authority system 102 can generate cryptographic security keys for users (both within or outside of the enterprise) based on attributes of the user. In some aspects, setup unit 104 can receive a security parameter λ as input. The security parameter λ may be provided from a configuration file or user input. The security parameter λ can be a positive integer that specifies the "hardness" of the cryptographic security provided by ABE system 100. In other words, the security parameter λ is a measure of how hard it is for an adversary to break the cryptographic scheme used by ABE system 100. The hardness may be expressed in terms of a time required to break the security. For example, λ may be an integer security parameter specifying that an adversary cannot break the security in time less than $2^\lambda$. Setup unit 104 can generate a key pair for the enterprise comprising a master public key (MPK) 108 and a master secret key (MSK) 110. Further details on example techniques used by setup unit 104 to generate MPK 108 and MSK 110 are provided below with respect to FIG. 3.

After setup 104 has generated MSK 110 and MPK 108, key generator 106 can generate secret keys 112 for users 109 based on attributes associated with the user. As an example, an attribute may identify a division or department of a company employing the user, a team that the user is assigned to, and/or a role of the user within the enterprise. Examples of departments include, for example, "accounting," "human resources," "research and development," "management," "information technology," etc. Examples of roles of a user include, for example, "president," "vice president," "accountant," "engineer," "scientist," etc. In some aspects, administrative device 101 obtain attributes 111 that describe attributes of a corresponding user. In the example presented in FIG. 1, user A is associated with attributes 111A and user B is associated with attributes 111B. A system administrator or other enterprise personnel can request that key generator 106 generate a secret key 112 for a user. In addition to attribute data 111 corresponding to a user, key generator 106 uses MSK 110 to generate secret key 112. In the example shown in FIG. 1, a user of administrator device 101 can request that key generator 106 generate a secret key 112A that is based on attribute data 111A describing attributes of user A and MSK 110. Once generated, key generator 106 can send secret key 112A to user device 109A of user A. Similarly, a user of administrator device 101 can request that key generator 106 generate a secret key 112B that is based on attribute data 111B describing attributes of user B and MSK 110. Once generated, key generator 106 can send secret key 112B to user device 109B of user B. In some aspects, a secret key 112 for a user may be included in a digital certificate that is associated with the user and installed on a user device 109 associated with the user. Further details on example techniques used by key generator 106 to generate a secret key 112 are provided below with respect to FIG. 4.

Encryption service 120 can receive plaintext 114 and encrypt plaintext 114 using techniques described herein to produce ciphertext 118. Encryption service 130 can encrypt plaintext 114 based on authorization attributes 116 and MPK 108. MPK 108 is generated as discussed above by setup 104 of key authentication system 102. Authorization attributes 116 may specify the attributes a user must have in order to decrypt ciphertext 118. In some aspects, authorization attributes 116 may be generated according to one or more of policies 115. A policy defines an access structure that specifies the attributes that parties must have in order to decrypt ciphertext 118. In some aspects, an access structure may be a monotone access structure. In a monotone access structure, a user must have at least the attributes determined based on policy 115 in order to decrypt ciphertext 118. The user may have other attributes in addition to those used to encrypt plaintext 114. Using the example of attributes that define a division, team, and/or role of a user, one of policies 115 may specify that in order to decrypt ciphertext 118, a user must have a role of manager of a research and development team of a particular division of an enterprise in order to decrypt ciphertext 118. The user may also have other associated attributes not included in authorization attributes 116. For example, such as attributes indicating that the user is an engineer in addition to being a manager, or the user is a manager of several different teams. In some aspects, these additional attributes may have no effect on the ability of the use to successfully decrypt ciphertext 118. Further details on example techniques used by encryption service 120 to encrypt plaintext 114 are provided below with respect to FIG. 5.

Decryption service 130 can receive ciphertext 118 and user secret key 112, and decrypt the ciphertext to produce decrypted text 124. In some aspects, decryption service 130 can determine authorization attributes for ciphertext 118 that are encoded into ciphertext 118 using techniques disclosed herein. Further, decryption service 130 can determine user attributes encoded into the user's secret key 112 using techniques disclosed herein. In some aspects, if the user attributes determined from the user's secret key are the same as, or a superset of, the authorization attributes, decrypted text 124 will match plaintext 114. If the authorization attributes associated with ciphertext 118 are not all included in the user attributes, then decryption of ciphertext 118 will fail and decrypted text 124 will not match plaintext 114 used to produce ciphertext 118. Further details on example techniques used by decryption service 130 to decrypt ciphertext 118 are provided below with respect to FIG. 6.

In some aspects, policy encoder 117 receives a policy 115 and determines authorization attributes 116 according to the policy 115. For example, policy encoder 117 can implement a randomized policy encoding function $$E_P: P_\lambda \to Z_q^l,$$

where $P_\lambda \subset \{p: \{0, 1\}^{l-1} \to \{0, 1\}\}$. In some aspects, attributes may be encoded by a deterministic attribute encoding function $$E_{att}: \{0, 1\}^{l-1} \to Z_q^l.$$

a user can only decrypt data if they have a secret key whose encoding is orthogonal to the policy's encoding:

$$E_{att}(a) \in E_P(p)^\perp \subset Z_p^l.$$

FIG. 2 is a flowchart illustrating example operations of a method for attribute based encryption, in accordance with techniques of the disclosure. The operations 200 of the method may be performed by key authority system 102, or a component thereof (e.g., setup unit 104, and/or key generator 106). Key authority system 102 can generate a cyclic group G having a prime order q (205). Key authority system 102 can select a first generator g and a second generator h from the cyclic group G (210). Key authority system 102 can generate an attribute key matrix M, wherein each row of M corresponds to a candidate attribute of a plurality of candidate attributes (215). Key authority system 102 can generate a first vector s and a second vector t, each of s and t having a length 1 corresponding to the number of candidate attributes (220). Key authority system 102 can generate a vector H having a length 1, as follows (215):

$$H_i = g^{s_i} h^{t_i} \text{ for } i = 1 \text{ to } l.$$

Key authority system 102 can generate a master public key (MPK) based, at least in part, on the cyclic group G, q, g, h, H and M (230). Key authority system 102 can generate a master secret key (MSK) based on the first vector s and the second vector t (235). Further details on operations 205-235 are discussed below with reference to FIG. 3.

Key authority system 102 can generate a user secret key, the user secret key based, at least in part, on the MSK and on a vector x representing one or more user attributes (240). Further details on generating a user secret key are discussed below with reference to FIG. 4.

Key authority system 102 can send the user secret key to a user device (245).

FIG. 3 is a flowchart illustrating example operations of a method for initializing an attribute based encryption system, in accordance with techniques of the disclosure. The operations 400 of the method can be executed, for example, by setup unit 104 (FIG. 1). Setup unit 104 can generate a cyclic group G of prime order q, where the bit-length of q is a polynomial in λ (305). In some aspects, setup unit 104 can instantiate a cyclic group as a subgroup of squares in $$Z_p^*,$$

where p is a safe prime (e.g., 2q+1 for p prime). As an example, a cyclic group can be generated randomly by sampling a random 2048-bit prime (for q, conditioned on p=2q+1 being prime). In some aspects, a cyclic group may be generated using elliptic curves with prime order groups. As an example, a cyclic may be generated using a 384-bit elliptic curve group.

Setup unit 104 can sample two generators g and h from the cyclic group: g, h←G (310). In some aspects, setup unit 104 can sample generators g and h by selecting a generator $g_0 \in G$, then sample a uniformly random, independent exponent for each:

$$g \leftarrow g_0^{w} \text{ and } h \leftarrow g_0^{w'} \text{ for } w, w' \leftarrow Z_p^*.$$

Setup unit 104 can sample two $Z_q$ vectors, s and t, of length 1, where 1 is the total number of candidate attributes that may be assigned to secret data to be encrypted, and where $$s, t \leftarrow Z_q^l. \tag{315}$$

Setup unit 104 can compute (320):

$$h_i := g^{s_i} h^{t_i} \in G \text{ for each } i = 1; \dots, l.$$

Setup unit 104 can generate an attribute key matrix (325). The attribute key matrix may be generated by concatenating a first identity matrix with a matrix v, wherein each element of v is non-zero and selected from the set of integers modulo p. For example, setup unit 104 can sample an 1–1 dimensional subspace of $$Z_p^l$$

to create the attribute key matrix M as follows:

$$M = [I_{l-1}|v] \in Z_p^{l-1 \times l}$$

Additionally, setup unit 104 can create a check matrix d comprising a concatenation of an inverse of a transpose of v with a second identity matrix. The creation of check matrix d can be represented by the formula $d=[-v^t, 1]$. Candidate attributes and their corresponding decryption keys may be based on the pair (M, d). The matrix M may be used to implement an "AND" gate, where a user can decrypt an encrypted message only if their secret key is orthogonal to all of the rows of M (e.g., a logical AND of the rows) used to encrypt the message. Such encryption and decryption are discussed below with reference to FIGS. 5 and 6. Additionally, the matrix M may be used to implement a rank-based encryption/decryption scheme as will be further discussed below.

Setup unit 104 can determine MPK 108 and MSK 110 (330). In some aspects, setup unit 104 can generate MPK 108 and MPK 110 as:

$$MPK = (q, G, h, g, (h_i)_1^l, M).$$
$$MSK = (s, t).$$

FIG. 4 is a flowchart illustrating example operations of a method for generating user secret keys, in accordance with techniques of the disclosure. In some aspects, the operations 400 can be implemented by key generator 106. In some aspects, key generator 106 can receive MSK 110 and a set of attributes of the user for which the key is to be assigned as input (405). In some aspects, the attributes of the user are represented by a vector X of length 1, where $X=(x_1, \dots, x_l)$. The vector X can be a bit vector that represents the attributes associated with the user, where $x_i=1$ if the user has attribute i, and $x_i=0$ if the user does not have attribute i. Key generator 106 can select a random vector $r \in Z_p$. Key generator 106 can create a vector $$y \in Z_p^l$$

where $y_i=r(-v_i \cdot x_i)$ for $i=1, \dots, l-1$ and $y_l=r^l$. Key generator 106 can generate components $sk_s$ and $sk_t$ of secret key $sk_X$ for user X, where:

$$sk_s = \langle y, s \rangle$$

$$sk_t = \langle y, t \rangle \text{ and}$$

$$sk_X = (y, sk_s, sk_t).$$

Secret key $sk_X$ can corresponding to user secret key 112A or user secret key 112B in the example shown in FIG. 1

FIG. 5 is a flowchart illustrating example operations of a method for encrypting data in an attribute based encryption system, in accordance with techniques of the disclosure. In some aspects, operations 500 can be executed by encryption service 120 and encryption protocol 122 of FIG. 1. In some aspects, encryption service 120 receives a plaintext message μ, MPK 108, and encryption attributes vector f (505). In some aspects, μ can be plaintext message 114. Message μ can be a file, a data object, or other data that is to be encrypted such that a user desiring to decrypt the message must have at least the attributes specified by f. Encryption protocol 122 can select a combination of rows of M (generated by setup unit 104 of FIG. 1) which correspond to the support of f: $v=z^{t}M$ where $z_j=0$ if $f_j=0$, and $z_j$ is uniformly independently random in $$Z_q^*$$

when $f_j=1$, for j=1, . . . , 1–1 (510).

Encryption protocol 122 can select a random non-zero exponent r, where $$r \leftarrow Z_q^*. \tag{515}$$

Encryption protocol 122 can then generate ciphertext $ct_f$ based on the input plaintext message μ, attribute vector f, r, g, h and s (520). In some aspects, $ct_f$ can correspond to ciphertext 118 of FIG. 1. Encryption protocol 122 can compute:

$$C := g^r, D := h^r,$$
$$c_i := \mu g^{s_i} h_i^r, \text{ and}$$
$$ct_f = (C, D, c) \in G^{i+2}$$

Encryption service 120 can return ciphertext $ct_f$ as an output of the service (525).

FIG. 6 is a flowchart illustrating example operations of a method for decrypting data in an attribute based encryption system, in accordance with techniques of the disclosure. In some aspects, operations 600 may be implemented by decryption service 130 and encryption protocol 122. Decryption service can receive ciphertext $ct_f$ and the secret key $sk_x$ of the user desiring to decrypt $ct_f$ (605). Ciphertext $ct_f$ can correspond to ciphertext 118 of FIG. 1, and $sk_x$ can correspond to secret key 112A or 112B of FIG. 1. As discussed above with respect to FIG. 5, $ct_f$ includes components C, D and c. To decrypt $ct_f$ encryption protocol 122 can compute (610):

$$\zeta = \left( \prod c_i^{y_i} \right) / \left( C^{sk_s} D^{sk_t} \right)$$

Additionally, encryption protocol 112 can compute (615):

$$z = \left( \sum y_i \right)^{-1} (\bmod\ q)$$

Encryption protocol 112 can then determine decrypted text μ (620):

$$\mu' = \zeta^z \in G$$

Decryption service 130 can return μ' as the output of the service. If the user attributes represented by f include all of the attributes used during encryption of message μ, messages μ and μ' will be the same plaintext (e.g., plaintext 114 of FIG. 1).

In the discussion of FIGS. 1-6 above, matrix M can be characterized as an "AND" gate where a user must possess, via their secret key each of the attributes associated with a ciphertext in order to decrypt the cipher text. In some aspects, matrix M may be organized to provide a rank based encryption/decryption scheme in which the rows of M represent a hierarchy of ranks, and the set of attributes used to encrypt and decrypt data can be a single attribute, i.e., a rank. For example, the first row of M may correspond to rank 1, the second row of M may correspond to rank 2 and so on. Let x be a random combination of the first n rows of M, and let the vector $y=(-v_1, -v_2, \ldots, -v_i, 0, 1)$ where $v_i \in Z_p$. In this case, the vector y is orthogonal to the first n rows of M, and a user with a key corresponding to y can decrypt ciphertext encrypted for levels 1, 2, . . . i. In other words, in order to decrypt data that was encrypted for rank n, the user must have a secret key having a rank n or higher encoded therein. Thus, the user can decrypt any message at or below his or her rank as specified by the user's secret key.

FIG. 7 is a block diagram illustrating further details of one example of a computing device that operates in accordance with one or more techniques of the present disclosure. FIG. 7 may illustrate a particular example of a server or other computing device 700 that includes one or more processor(s) 702 for executing any one or more of key authority system 102, encryption service 120, decryption service 130, or any other system, application, node software, or module described herein. Other examples of computing device 700 may be used in other instances. Although shown in FIG. 7 as a stand-alone computing device 700 for purposes of example, a computing device may be any component or system that includes one or more processors or other suitable computing environment for executing software instructions and, for example, need not necessarily include one or more elements shown in FIG. 7 (e.g., communication units 706; and in some examples components such as storage device(s) 708 may not be co-located or in the same chassis as other components). As shown in the specific example of FIG. 7, computing device 700 includes one or more processors 702, one or more input devices 704, one or more communication units 706, one or more output devices 712, one or more storage devices 708, and user interface (UI) device 710. Computing device 700, in one example, further includes one or more applications 722 and operating system 716 that are executable by computing device 700. Each of components 702, 704, 706, 708, 710, and 712 are coupled (physically, communicatively, and/or operatively) for inter-component communications. In some examples, communication channels 714 may include a system bus, a network connection, an inter-process communication data structure, a message bus, or any other method for communicating data. As one example, components 702, 704, 706, 708, 710, and 712 may be coupled by one or more communication channels 714.

Processors 702, in one example, are configured to implement functionality and/or process instructions for execution within computing device 700. For example, processors 702 may be processing circuitry capable of processing instructions stored in storage device 708. Examples of processors 702 may include, any one or more of a microprocessor, a controller, a digital signal processor (DSP), an application specific integrated circuit (ASIC), a field-programmable gate array (FPGA), or equivalent discrete or integrated logic circuitry.

One or more storage devices 708 may be configured to store information within computing device 700 during operation. Storage device 708, in some examples, is described as a computer-readable storage medium. In some examples, storage device 708 is a temporary memory, meaning that a primary purpose of storage device 708 is not long-term storage. Storage device 708, in some examples, is described as a volatile memory, meaning that storage device 708 does not maintain stored contents when the computer is turned off. Examples of volatile memories include random access memories (RAM), dynamic random access memories (DRAM), static random access memories (SRAM), and other forms of volatile memories known in the art. In some examples, storage device 708 is used to store program instructions for execution by processors 702. Storage device 708, in one example, is used by software or applications running on computing device 700 to temporarily store information during program execution.

Storage devices 708, in some examples, also include one or more computer-readable storage media. Storage devices 708 may be configured to store larger amounts of information than volatile memory. Storage devices 708 may further be configured for long-term storage of information. In some examples, storage devices 708 include non-volatile storage elements. Examples of such non-volatile storage elements include magnetic hard discs, optical discs, floppy discs, flash memories, or forms of electrically programmable memories (EPROM) or electrically erasable and programmable (EE-PROM) memories.

Computing device 700, in some examples, also includes one or more communication units 706. Computing device 700, in one example, utilizes communication units 706 to communicate with external devices via one or more networks, such as one or more wired/wireless/mobile networks. Communication units 706 may include a network interface card, such as an Ethernet card, an optical transceiver, a radio frequency transceiver, or any other type of device that can send and receive information. In some examples, computing device 700 uses communication unit 706 to communicate with an external device.

Computing device 700, in one example, also includes one or more user interface devices 710. User interface devices 710, in some examples, are configured to receive input from a user through tactile, audio, or video feedback. Examples of user interface devices(s) 710 include a presence-sensitive display, a mouse, a keyboard, a voice responsive system, video camera, microphone, or any other type of device for detecting a command from a user. In some examples, a presence-sensitive display includes a touch-sensitive screen.

One or more output devices 712 may also be included in computing device 700. Output device 712, in some examples, is configured to provide output to a user using tactile, audio, or video stimuli. Output device 712, in one example, includes a presence-sensitive display, a sound card, a video graphics adapter card, or any other type of device for converting a signal into an appropriate form understandable to humans or machines. Additional examples of output device 712 include a speaker, a cathode ray tube (CRT) monitor, a liquid crystal display (LCD), or any other type of device that can generate intelligible output to a user.

Computing device 700 may include operating system 716. Operating system 716, in some examples, controls the operation of components of computing device 700. For example, operating system 716, in one example, facilitates the communication of one or more applications 722 with processors 702, communication unit 706, storage device 708, input device 704, user interface devices 710, and output device 712.

Applications 722 may also include program instructions and/or data that are executable by computing device 700. Example applications 722 executable by computing device 700 may include application and/or other software to implement capabilities described above. For example, applications 722 can include applications associated with key authority system 102, user devices 109, encryption service 120, and decryption service 130. As non-limiting examples, such applications may include document management applications, document processing applications, email applications, image processing applications, financial applications etc. The techniques disclosed herein may be included a part of, or as a plug-in to, any application that performs ABE.

The techniques described in this disclosure may be implemented, at least in part, in hardware, software, firmware, or any combination thereof. For example, various aspects of the described techniques may be implemented within one or more processors, including one or more microprocessors, digital signal processors (DSPs), application-specific integrated circuits (ASICs), field-programmable gate arrays (FPGAs), or any other equivalent integrated or discrete logic circuitry, as well as any combinations of such components. The term "processor" or "processing circuitry" may generally refer to any of the foregoing logic circuitry, alone or in combination with other logic circuitry, or any other equivalent circuitry. A control unit comprising hardware may also perform one or more of the techniques of this disclosure.

Such hardware, software, and firmware may be implemented within the same device or within separate devices to support the various operations and functions described in this disclosure. In addition, any of the described units, modules or components may be implemented together or separately as discrete but interoperable logic devices. Depiction of different features as modules or units is intended to highlight different functional aspects and does not necessarily imply that such modules or units must be realized by separate hardware or software components. Rather, functionality associated with one or more modules or units may be performed by separate hardware or software components or integrated within common or separate hardware or software components.

The techniques described in this disclosure may also be embodied or encoded in a computer-readable medium, such as a computer-readable storage medium, containing instructions. Instructions embedded or encoded in a computer-readable storage medium may cause a programmable processor, or other processor, to perform the method, e.g., when the instructions are executed. Computer readable storage media may include random access memory (RAM), read only memory (ROM), programmable read only memory (PROM), erasable programmable read only memory (EPROM), electronically erasable programmable read only memory (EEPROM), flash memory, a hard disk, a CD-ROM, a floppy disk, a cassette, magnetic media, optical media, or other computer readable media.

What is claimed is:

1. A method comprising:
generating, by one or more processors, a cyclic group G having a prime order q;
selecting, by the one or more processors, a first generator g and a second generator h from the cyclic group G;
generating, by the one or more processors, an attribute key matrix M, wherein each row of M corresponds to a candidate attribute of a plurality of candidate attributes;
generating a first vector s and a second vector t, each of s and t having a length l corresponding to a number of candidate attributes;
generating a vector H having the length l, wherein each $i^{th}$ component of H comprises a value determined by:

$$g^{s_i} h^{t_i}$$

generating, by the one or more processors, a master public key (MPK) based, at least in part, on the cyclic group G, q, g, h, H and M;
generating a master secret key (MSK) based on the first vector s and the second vector t;
generating, by the one or more processors, a user secret key, the user secret key based, at least in part, on the MSK and on a vector x representing one or more user attributes; and
sending, by the one or more processors, the user secret key to a user device.

2. The method of claim 1, further comprising sampling a random prime q according to:

$$p = 2*q+1,$$

wherein generating the cyclic group G comprises generating a subgroup of squares in the set of integers modulo p.

3. The method of claim 2, wherein generating the attribute key matrix M comprises concatenating a first identity matrix with a vector v, wherein each element of v is non-zero and selected from the set of integers modulo p.

4. The method of claim 3, further comprising generating a check matrix d comprising a concatenation of a negative of a transpose of the vector v with a second identity matrix; wherein a row of M corresponding to a candidate attribute comprises a decryption key based on the pair (M, d).

5. The method of claim 4, wherein generating the user secret key comprises:
generating a random vector r from the set of integers modulo p;
generating a vector y according to the formula:
$y_i = r(-v_i \cdot x_i)$ for i=1 to l−1, and $y_l = r^1$, where $x_i$ is a vector of attributes associated with the user;
determining a first user secret key component $sk_s$ according to the inner product of y and s;
determining a second user secret key component $sk_t$ according to the inner product of y and t; and
generating the user secret key as a concatenation of y, $sk_s$ and $sk_t$.

6. The method of claim 1, wherein generating the cyclic group G comprises generating a prime order group using an elliptic curve.

7. The method of claim 1, further comprising:
receiving a plaintext message µ and a vector f of authorization attributes selected from the plurality of candidate attributes;
selecting a subset of the rows of M corresponding to the vector f of authorization attributes; and
encrypting the plaintext message µ in accordance with the MPK and the selected subset of rows of M to create a ciphertext message.

8. The method of claim 7, further comprising:
selecting a random non-zero exponent r from a group of integers modulo q;
determining a first component C of the ciphertext message according to $C := g^r$;
determining a second component D of the ciphertext message according to $D := h^r$;
determining a third component c of the ciphertext message, c having i subcomponents $c_i$, wherein i represents a number of attributes n in the vector f of authorization attributes, and wherein each $c_i$ is determined according to the formula $$c_i := \mu g^{s_i} H_i^r$$

for i=1 . . . n; and
concatenating C, D and c to create the ciphertext message.

9. The method of claim 7, wherein the vector f comprise identifies a hierarchical rank corresponding to an integer n, and
wherein selecting the subset of the rows of M comprises selecting the first n−1 rows of M.

10. The method of claim 1, further comprising:
receiving a ciphertext message having components c, C and D, and a user secret key having components y, $sk_s$, and $sk_t$;
determining a first value ζ according to the formula $$\frac{\left(\zeta = \prod c_i^{y_i}\right)}{C^{sk_s} D^{sk_t}};$$

determining a second value z according to the formula $z = (\Sigma y_i)^{-1} \pmod q$; and
determining output plaintext µ' according to the formula $\mu' = \zeta^z \in G$.

11. The method of claim 10, wherein plaintext µ associated with the ciphertext message and µ' match if y is orthogonal to each row of a set of rows of M selected according to a set of authorization attributes.

12. An attribute based encryption system comprising:
one or more processors; and
a key generator executable by the one or more processors and configured to:
generate a cyclic group G having a prime order q,
select a first generator g and a second generator h from the cyclic group G,
generate an attribute key matrix M, wherein each row of M corresponds to a candidate attribute of a plurality of candidate attributes,

15 generate a first vector s and a second vector t, each of
s and t having a length l corresponding to a number
of candidate attributes,
generate a vector H having the length l, wherein each
$i^{th}$ component of H comprises a value determined by:

$$g^{s_i} h^{t_i},$$

generate a master public key (MPK) based, at least in
part, on the cyclic group G, q, g, h, H and M,
generate a master secret key (MSK) based on the first
vector s and the second vector t,
generate a user secret key, the user secret key based, at
least in part, on the MSK and on a vector x repre-
senting one or more user attributes, and
send the user secret key to a user device.
13. The attribute based encryption system of claim 12,
wherein the key generator is further configured to sample a
random prime q according to:

$$p = 2 * q + 1,$$

wherein to generate the cyclic group G, the key generator
is configured to generate a subgroup of squares in the
set of integers modulo p, and
wherein to generate the attribute key matrix M, the key
generator is configured to concatenate a first identity
matrix with a vector v, wherein each element of v is
non-zero and selected from the set of integers modulo
p.
14. The attribute based encryption system of claim 13,
wherein the key generator is further configured to generate
a check matrix d comprising a concatenation of a negative
of a transpose of the vector v with a second identity matrix;
wherein a row of M corresponding to a candidate attribute
comprises a decryption key based on the pair (M, d).
15. The attribute based encryption system of claim 13,
wherein the key generator is further configured to:
generate a random vector r from the set of integers
modulo p;
generate a vector y according to the formula:
$y_i=r(-v_i \cdot x_i)$ for i=1 to l−1, and $y_l=r^1$, where $x_i$ is a vector
of attributes associated with the user;
determine a first user secret key component $sk_s$ according
to the inner product of y and s;
determine a second user secret key component $sk_t$ accord-
ing to the inner product of y and t; and
generate the user secret key as a concatenation of y, $sk_s$
and $sk_t$.
16. The attribute based encryption system of claim 12,
further comprising an encryption service executable by the
one or more processors, the encryption service configured
to:
receive a plaintext message μ and a vector f of authori-
zation attributes selected from the plurality of candidate
attributes;
select a subset of the rows of M corresponding to the
vector f of authorization attributes; and
encrypt the plaintext message μ in accordance with the
MPK and the selected subset of rows of M to create a
ciphertext message.
17. The attribute based encryption system of claim 16,
wherein the encryption service is further configured to:

select a random non-zero exponent r from a group of
integers modulo q;
determine a first component C of the ciphertext message
according to $C:=g^r$;
determine a second component D of the ciphertext mes-
sage according to $D:=h^r$;
determine a third component c of the ciphertext message,
c having i subcomponents $c_i$, wherein i represents a
number of attributes n in the vector f of authorization
attributes, and wherein each $c_i$ is determined according
to the formula $$c_i := \mu g^{s_i} H_i^r$$

for i=1 . . . n; and
concatenate C, D and c to create the ciphertext message.
18. The attribute based encryption system of claim 12,
further comprising a decryption service executable by the
one or more processors, the decryption service configured
to:
receive a ciphertext message having components c, C and
D, and a user secret key having components y, $sk_s$, and
$sk_t$;
determine a first value ζ according to the formula $$\zeta = \frac{(\zeta = \prod c_i^{y_i})}{C^{sk_s} D^{sk_t}};$$

determine a second value z according to the formula
$z=(\Sigma y_i)^{-1}(mod\ q)$; and
determine output plaintext μ' according to the formula
$\mu'=\zeta^z \in G$.
19. The attribute based encryption system of 18, wherein
the plaintext μ associated with the ciphertext message and
the plaintext μ' match if y is orthogonal to each row of a set
of rows of M selected according to a set of authorization
attributes.
20. A method comprising:
generating, by one or more processors, a cyclic group G
having a prime order q;
generating, by the one or more processors, an attribute
key matrix M, wherein each row of M corresponds to
a candidate attribute of a plurality of candidate attri-
butes;
generating, by the one or more processors, a master public
key (MPK) based, at least in part, on the cyclic group
G and M;
generating a master secret key (MSK) based on a first
vector s and a second vector t, where s and t each
represent an encryption policy;
generating, by the one or more processors, a user secret
key, the user secret key based, at least in part, on the
MSK and on a set of one or more user attributes; and
sending, by the one or more processors, the user secret
key to a user device,
wherein a first plaintext μ associated with a ciphertext
message and second plaintext μ' associated with a
decryption of the ciphertext message match if a vector
y associated with attributes of the user associated with
the user secret key is orthogonal to each row of a set of
rows of M selected according to a set of authorization
attributes used to encrypt the first plaintext μ.

21. The method of claim 20, further comprising sampling a random prime q according to:

$$p = 2 * q + 1,$$

wherein generating the cyclic group G comprises generating a subgroup of squares in the set of integers modulo p, and wherein generating the attribute key matrix M comprises concatenating a first identity matrix with a vector v, wherein each element of v is non-zero and selected from the set of integers modulo p.

22. The method of claim 21, further comprising:

generating a check matrix d comprising a concatenation of a negative of a transpose of the vector v with a second identity matrix, wherein a row of M corresponding to a candidate attribute comprises a decryption key based on the pair (M, d).

23. The method of claim 21, wherein generating the user secret key comprises:

generating a random vector r from the set of integers modulo p;

generating a vector y according to the formula:

$y_i = r(-v_i \cdot x_i)$ for i=1 to l−1, and $y_l = r^l$, where $x_i$ is a vector of attributes associated with the user;

determining a first user secret key component $sk_s$ according to the inner product of y and s;

determining a second user secret key component $sk_t$ according to the inner product of y and t; and generating the user secret key as a concatenation of y, $sk_s$ and $sk_t$.

24. The method of claim 20, further comprising:

receiving a plaintext message μ and a vector f of authorization attributes selected from the plurality of candidate attributes;

selecting a subset of the rows of M corresponding to the vector f of authorization attributes; and encrypting the plaintext message μ in accordance with the MPK and the selected subset of rows of M to create a ciphertext message.

25. The method of claim 20, further comprising:

receiving a ciphertext message having components c, C and D, and a user secret key having components y, $sk_s$, and $sk_t$;

determining a first value ζ according to the formula $$\frac{(\zeta = \prod c_i^{y_i})}{C^{sk_s} D^{sk_t}};$$

determining a second value z according to the formula $z = (\Sigma y_i)^{-1} \pmod q$, where q is a prime; and determining output plaintext μ' according to the formula $\mu' = \zeta^z \in G$.

\* \* \* \* \*